Dec. 14, 1943.  A. C. EVERETT  2,336,606
CLOSURE HANDLING APPARATUS
Filed July 29, 1941  5 Sheets-Sheet 1
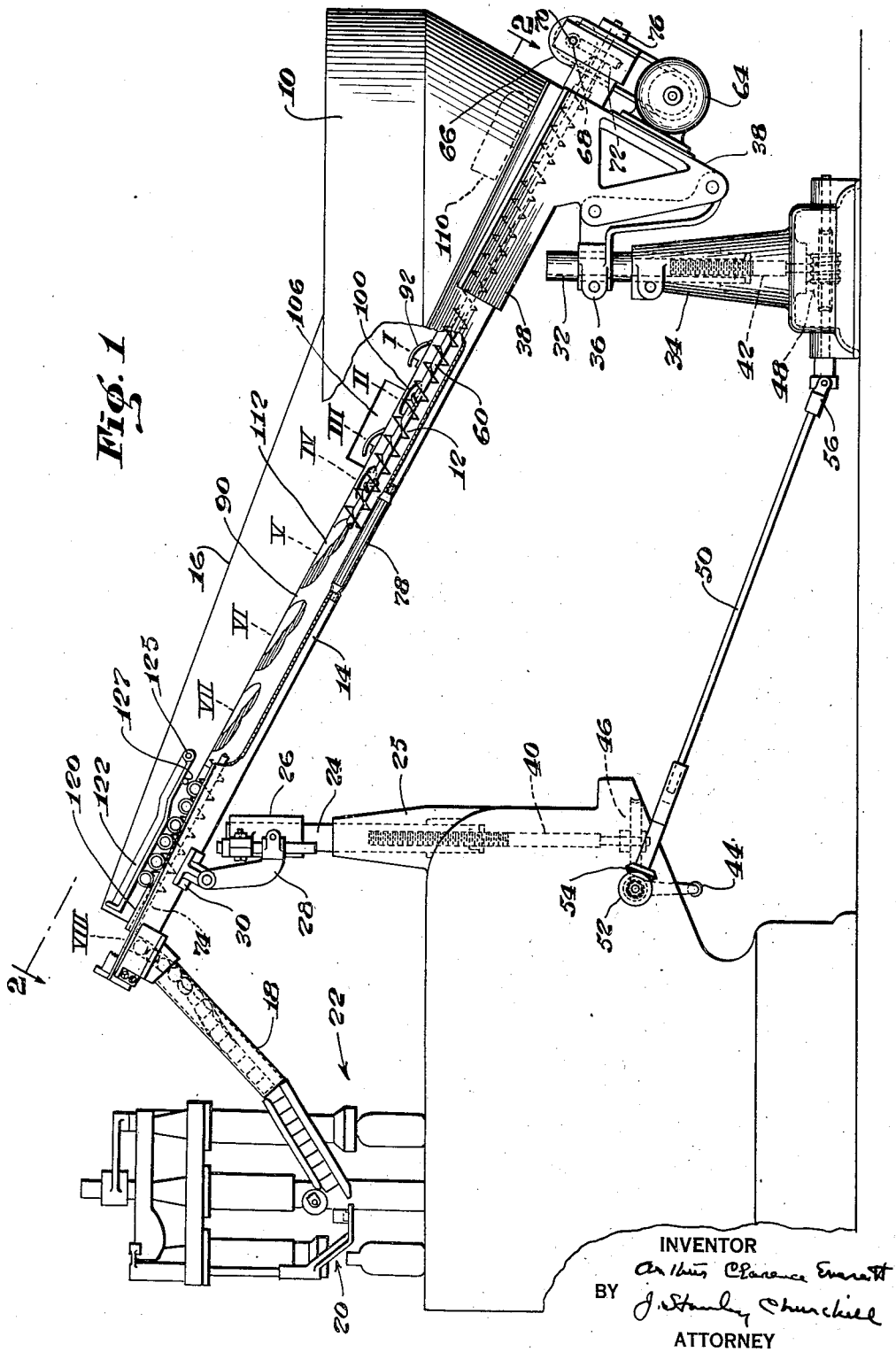
INVENTOR
Arthur Clarence Everett
BY J. Stanley Churchill
ATTORNEY Dec. 14, 1943.  A. C. EVERETT  2,336,606
CLOSURE HANDLING APPARATUS
Filed July 29, 1941  5 Sheets-Sheet 2
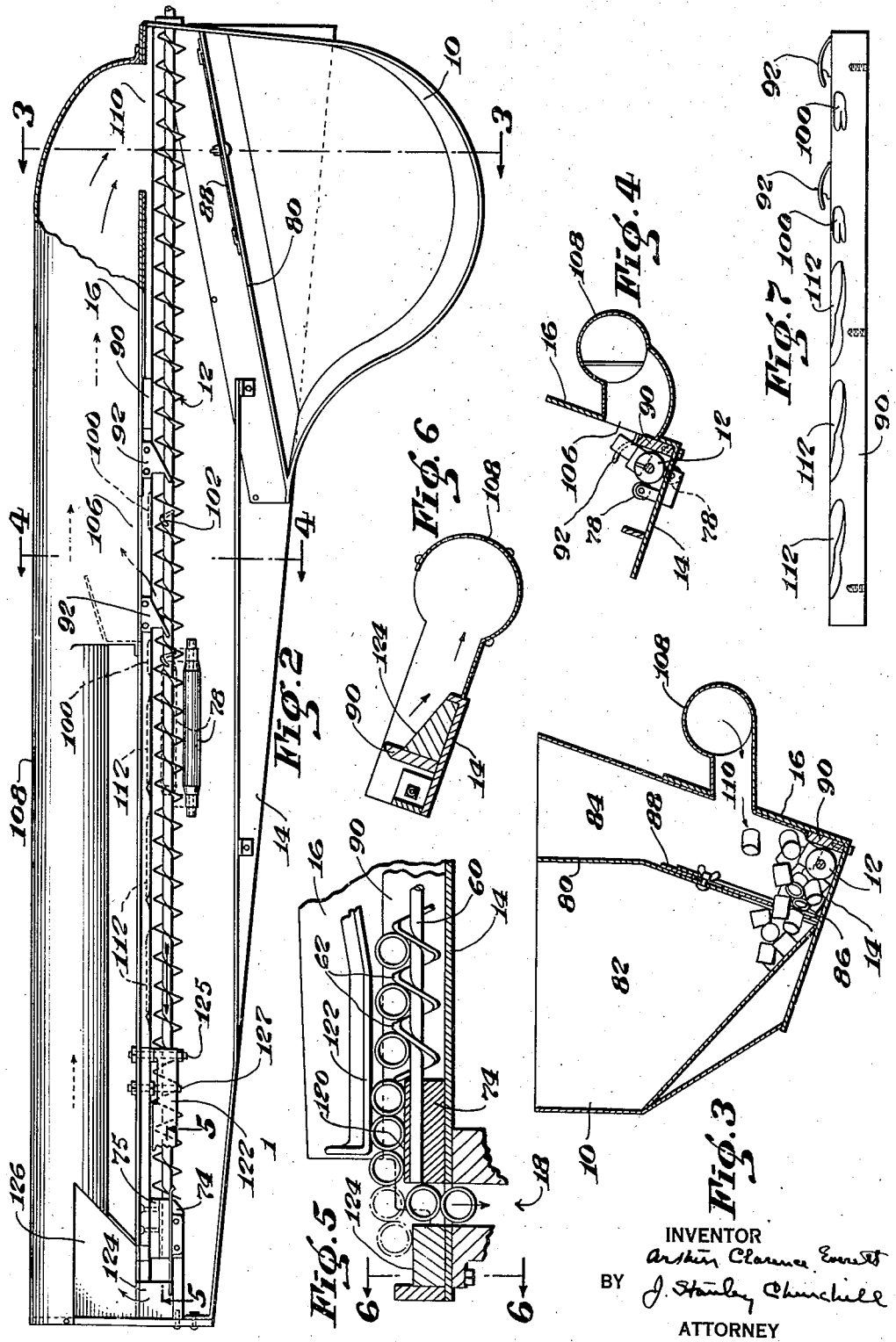
INVENTOR
Arthur Clarence Everett
BY J. Stanley Churchill
ATTORNEY Dec. 14, 1943.     A. C. EVERETT     2,336,606
CLOSURE HANDLING APPARATUS
Filed July 29, 1941     5 Sheets-Sheet 3
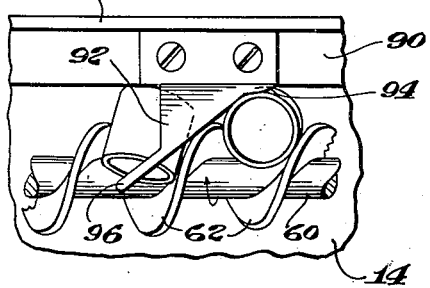
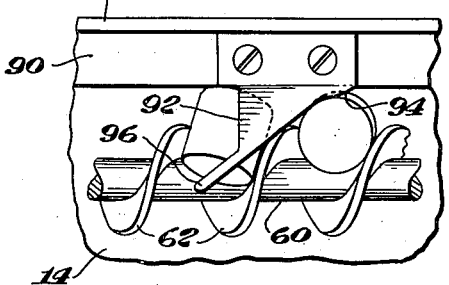
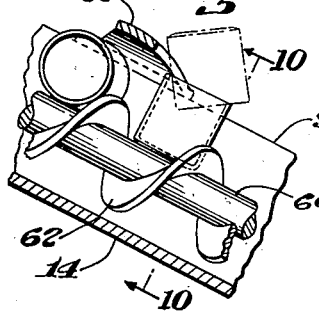
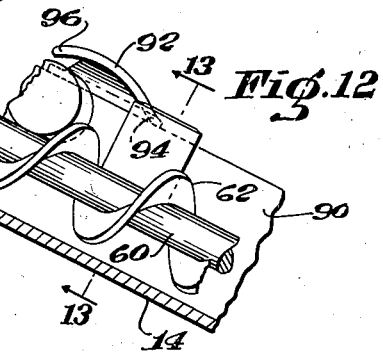
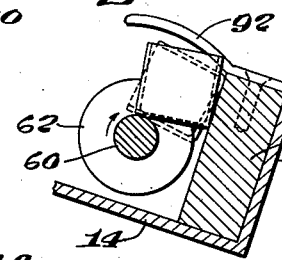
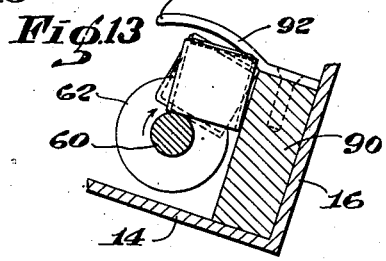
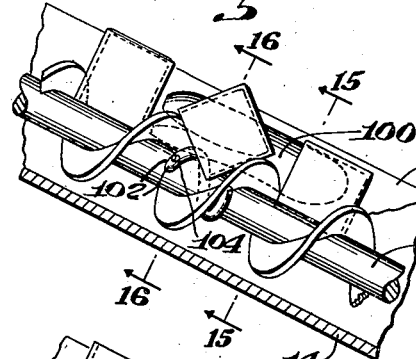
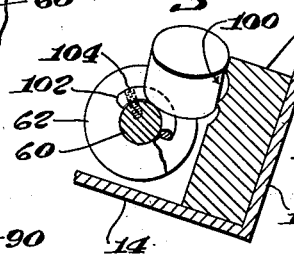
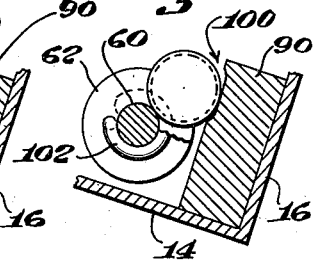
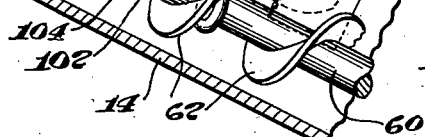
INVENTOR
Arthur Clarence Everett
BY J. Stanley Churchill
ATTORNEY Dec. 14, 1943.  A. C. EVERETT  2,336,606
CLOSURE HANDLING APPARATUS
Filed July 29, 1941   5 Sheets—Sheet 4
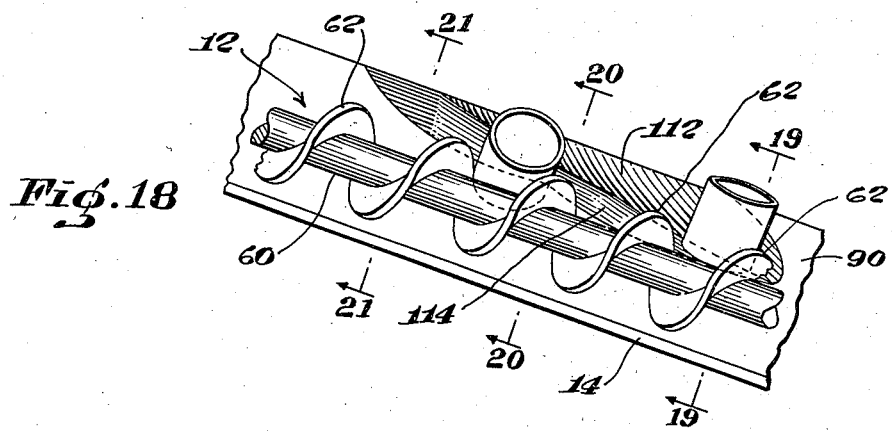
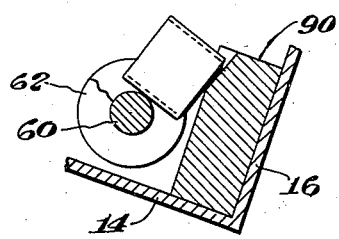
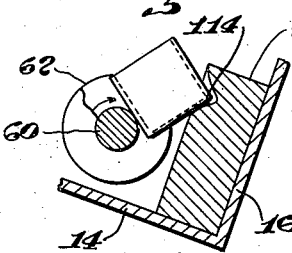
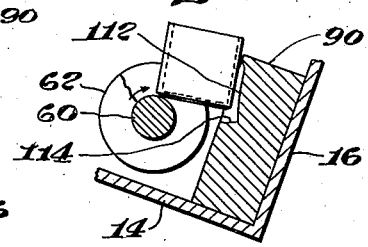
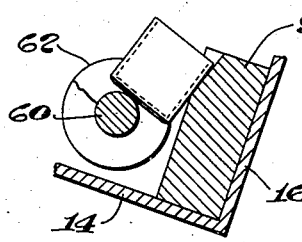
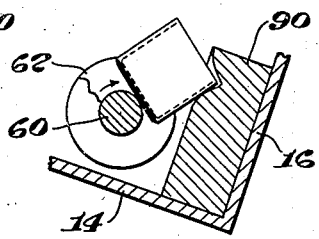
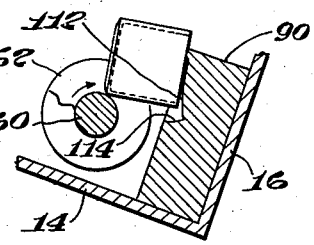
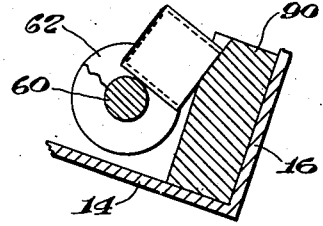
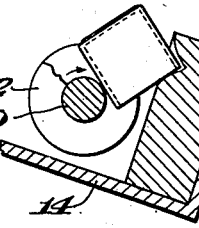
INVENTOR
Arthur Florence Everett
BY J. Stanley Churchill
ATTORNEY

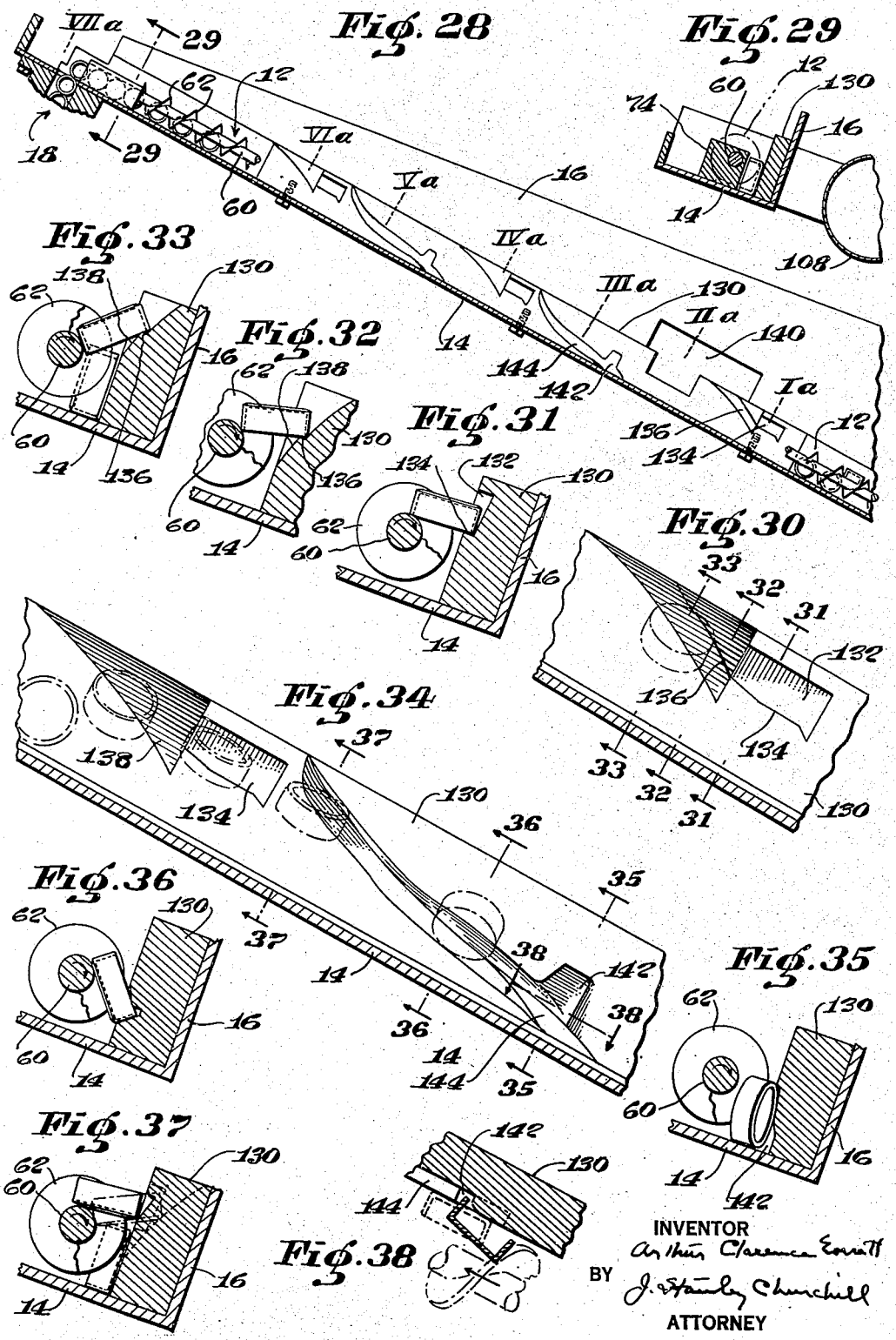

Patented Dec. 14, 1943

2,336,606

UNITED STATES PATENT OFFICE 2,336,606

CLOSURE HANDLING APPARATUS

Arthur Clarence Everett, Boston, Mass., assignor to Pneumatic Scale Corporation, Limited, Quincy, Mass., a corporation of Massachusetts Application July 29, 1941, Serial No. 404,453

17 Claims. (Cl. 198—33)

This invention relates to closure handling apparatus.

The invention has for an object to provide a novel and improved closure handling apparatus which is adapted to withdraw successive closures such as bottle caps, from a bulk supply thereof, to turn certain of the closures, as will be described, to cause all to assume a uniform arrangement, and to present them to a position from which they may be transferred to operative position with respect to other instrumentalities in a simple, positive and expeditious manner.

With this general object in view and such others as may hereinafter appear, the invention consists in the closure handling apparatus, and in the various structures, arrangements and combinations of parts hereinafter described and particularly defined in the claims at the end of this specification.

In the drawings illustrating the preferred embodiment of the invention, Fig. 1 is a side elevation of closure handling apparatus embodying the present invention particularly adapted for handling a closure which is relatively tall with relation to its diameter, the apparatus being illustrated as employed in connection with a closure applying machine; Fig. 2 is an enlarged plan view of the apparatus as viewed from the line 2—2 of Fig. 1; Fig. 3 is a cross section on the line 3—3 of Fig. 2, showing the hopper construction; Fig. 4 is a cross section on the line 4—4 of Fig. 2, showing the preferred angular arrangement of the hopper bottom and side walls; Fig. 5 is a longitudinal cross section taken on the line 5—5 of Fig. 2 showing the delivery end of the apparatus; Fig. 6 is a cross sectional detail taken on the line 6—6 of Fig. 5 illustrating the construction at the end of the apparatus for disposing of surplus caps and returning them to the bulk supply; Fig. 7 is a detail view, in side elevation, showing the guide plate by which the closures are caused to be turned to arrange them in the same direction; Fig. 8 is an enlarged plan view of identical portions of the apparatus as indicated at stations I and III in Fig. 1 and illustrating the operation of the apparatus when a closure arrives at such stations with its open end facing upwardly; Fig. 9 is a side elevation of Fig. 8; Fig. 10 is a cross section on the line 10—10 of Fig. 9; Figs. 11, 12 and 13 are views similar to Figs. 8, 9 and 10 respectively, illustrating the operation of the apparatus when a closure arrives at stations I or III with its open end facing downwardly; Fig. 14 is an enlarged side elevation of identical portions of the apparatus as indicated at stations II and IV in Fig. 1, illustrating the operation of the apparatus when a closure arrives at such stations with its open end facing forward; Figs. 15 and 16 are cross sectional views on the lines 15—15 and 16—16 respectively of Fig. 14; Fig. 17 is a view similar to Fig. 14, illustrating the operation of the apparatus when a closure arrives at stations II or IV with its open end facing rearwardly; Fig. 18 is a side elevation of identical portions of the apparatus as indicated at stations V, VI and VII in Fig. 1 illustrating the operation of the apparatus when a closure arrives at such stations with its open end facing upwardly; Figs. 19, 20 and 21 are cross sectional details taken on the lines 19—19, 20—20 and 21—21 respectively of Fig. 18; Figs. 22, 23 and 24 are cross sectional views similar to Figs. 19, 20 and 21 showing the operation of the apparatus when a closure arrives at stations V, VI or VII with its open end facing away from the observer as viewed in Fig. 1; Figs. 25, 26 and 27 are cross sectional views similar to Figs. 19, 20 and 21 showing the operation of the apparatus when a closure arrives at stations V, VI or VII with its open end facing downwardly; Fig. 28 is a side elevation partly in cross section of a modified form of closure handling apparatus, and which is particularly adapted for handling a closure which is relatively short with relation to its diameter; Fig. 29 is an enlarged cross sectional view taken on the line 29—29 of Fig. 28 showing the construction of the delivery end of the apparatus in the modified structure; Fig. 30 is an enlarged detail view in side elevation of a portion of the apparatus as indicated at station Ia in Fig. 28 and illustrating the operation of the apparatus when a closure arrives at such station with its open end facing downwardly; Figs. 31, 32 and 33 are cross sectional views taken on the lines 31—31, 32—32 and 33—33 respectively of Fig. 30; Fig. 34 is an enlarged detail view in side elevation of portions of the apparatus indicated at IIIa and IVa of Fig. 28, these portions being similar to stations Va and VIa respectively, and illustrates the operation of the apparatus when a closure arrives at such stations with its open end facing away from the observer viewing Fig. 28; and Figs. 35, 36, 37 and 38 are cross sectional views taken on the lines 35—35, 36—36, 37—37 and 38—38 respectively of Fig. 34.

In general the present invention contemplates closure handling apparatus for use in connection with the feeding mechanism of a closure applying machine or with other instrumentalities, such as a closure lining machine or a closure packing device, wherein it is desired to deliver the closures, such as bottle caps, in a uniformly disposed arrangement. In the preferred embodiment of the invention, provision is made for continuously withdrawing successive closures at random from a bulk supply thereof, in which the closures are haphazardly arranged, and to dispose the closures in a uniform arrangement during their progress to the delivery end of the apparatus whereby the closures may be delivered to the feeding mechanism or other device in a position from which they may be conveniently and readily transferred to operative position with respect to other instrumentalities.

In its preferred form, the invention is illustrated in connection with a bottle capping machine provided with mechanism for transferring the caps from a feeding chute to a cap holding device and for thereafter relatively moving the cap holding device and a container to apply the cap to the container. The present closure handling apparatus is adapted to deliver the caps to the feeding chute properly positioned to be transferred to the cap holding device. In general, the illustrated closure handling apparatus comprises a hopper in which the closures are dumped and a screw conveyer arranged to withdraw successive closures at random from the bulk supply. The screw conveyer is preferably disposed at an upwardly inclined angle with relation to the horizontal and suitable guides provided adjacent the conveyer screw are arranged to effect turning of the haphazardly arranged closures being carried forwardly and upwardly by the screw conveyer in a manner such as to dispose them in uniform arrangement when they arrive at the delivery end of the apparatus.

The embodiment of the invention as illustrated in Figs. 1 to 27 inclusive, shows a construction particularly adapted for handling closures which are relatively tall with relation to their diameters, the modified form of the invention, as illustrated in Figs. 28 to 38 inclusive, showing a construction particularly adapted for handling closures which are relatively short with relation to their diameters. Although it is preferred to modify the construction of the apparatus to handle closures which vary in height from one extreme to another, it was found in practice that each construction illustrated was operative upon closures of varying diameters and heights so that in many instances, the same apparatus may be used for a number of different sizes of closures.

Referring now to the drawings, see Fig. 1, the closure handling apparatus therein shown comprises, in general, a hopper 10 in which a bulk supply of closures may be stored, and a screw conveyer 12, preferably arranged at an upwardly inclined angle, which passes through and extends beyond the haphazardly arranged bulk supply of the closures in the hopper 10. The screw conveyer 12 is rotatable in an upwardly inclined guideway comprising a bottom wall 14 and a side wall 16 extending from the hopper bottom, and the delivery end of the apparatus is provided with a downwardly extended guide chute 18 forming part of a closure feeding device into which the closures are deposited. As illustrated in Fig. 1, the feed chute 18 is arranged to guide the closures to a position to be withdrawn by a transferring device, indicated generally at 20, forming part of a closure applying machine 22.

The apparatus is supported at its upper end upon a shaft 24 mounted for vertical adjustment in a standard 25 formed integrally with the frame of the closure applying machine. Brackets 26, 28, 30 connecting the shaft 24 with the bottom wall 14 are arranged to be vertically and pivotally adjusted in order to support the delivery end of the apparatus in a position to present the feed chute 18 in operative relation to the transferring mechanism 20. The lower end of the apparatus is supported upon a shaft 32 mounted for vertical adjustment in a standard 34 resting upon the floor. A bracket 36 clamped to the shaft 32 is arranged to pivotally support a bracket 38 connected to the underside of the hopper 10.

As herein shown, provision is made for simultaneously raising or lowering the supporting shafts 24, 32 in order to adjust the position of the apparatus. Each vertically supported shaft 24, 32 is internally threaded and arranged to receive threaded rods 40, 42, which cooperate with the threaded portions of the shafts 24, 32 to effect vertical adjustment thereof when the rods 40, 42 are rotated. Rotation of the rods 40, 42 is effected manually by a crank handle 44 through connections including worm and worm wheel gear connections 46, 48, the lower adjusting unit being operatively connected to the upper adjusting unit by an angularly disposed shaft 50, bevel gears 52, 54 and universal joint 56, as clearly illustrated in Fig. 1.

The screw conveyer 12 comprises a central cylindrical shank 60 having a continuous helical member spirally extended about the shank 60, the convolutions of the helix forming adjacent rib sections 62 between which the caps are carried. The pitch of the screw, in the embodiment of the invention as illustrated in Fig. 1, is preferably equal to or slightly greater than the diameter of or height of the largest cap in the group to be run. Provision is made for rotating the screw conveyer 12 and as herein shown, an electric motor 64 mounted on the bracket 38 is belted to a pulley 66. A worm gear 68 mounted on the pulley shaft 70 is arranged to mesh with a worm wheel 72 fast upon the screw conveyer shank 60. The shank 60 is journaled in suitable bearings 74, 76 and, as illustrated in Figs. 1 and 4, a pair of longitudinal rollers 78 may be provided at a point intermediate the ends of the screw conveyer and which are disposed in contiguous engagement with the helical ribs 62 in order to provide lateral support along one side and the bottom of the elongated screw.

From the description thus far and by reference to the drawings, it will be observed that in the operation of the apparatus, the caps or closures deposited in the hopper 10 will successively fall between adjacent helical ribs 62 of the screw conveyer 12 and be conveyed upwardly and forwardly away from the bulk supply. In order to control, to some extent at least, the movement of the bulk supply of caps and to assist in directing the caps into the spaces between the helical ribs, it is preferred to provide a partition plate 80 in the hopper as shown in Fig. 3, forming a chamber 82 into which the bulk supply of caps is deposited, and a chamber 84 through which the screw conveyer 12 runs. The caps are permitted to pass by gravity from the chamber 82 into the chamber 84 under the partition member 80 and through an opening 86 therein and the feed of the caps may be controlled by an adjustable plate 88 to vary the size of the opening for different sizes of caps. It has been found that this expedient prevented arching of the caps over the screw conveyer and contributed to the free flow of caps into the spaces between the helical ribs.

As illustrated in Figs. 1, 3 and 4, the upwardly inclined position of the apparatus and the angular relationship of the bottom and side walls 14, 16 is such that the closures or caps which fall on top of the shank 60 and between the helical ribs of the screw conveyer are retained in this position and are carried upwardly and forwardly riding on top of the shank. The closures thus being conveyed are supported on one side by a guide plate 90 secured to the side wall 16, the caps being retained on top of the shank and in frictional engagement with the guide plate 90 by gravity and by virtue of the relationship of the plate 90 to the axis of the screw conveyer. In the illustrated embodiment of the invention, see Fig. 1, the apparatus is inclined upwardly at an angle of approximately 30 degrees from the horizontal. Referring to Fig. 4, the guide plate 90, adjacent and relatively close to one side of the screw conveyer is illustrated as inclined at an angle of approximately 20 degrees from the vertical, and the diameter of the screw with relation to the size of the cap is such that gravity causes the cap to ride along on top of the shank in frictional engagement with the guide plate 90. It will be understood that the specific angular arrangement of the parts as herein described, are merely illustrative of one embodiment of the invention and may be varied, the object being to retain the caps on top of the shank 60 and against the plate 90 as they are carried upwardly and forwardly between the helical ribs of the screw conveyer. Any caps resting on the bottom 14 of the chute which are caught between the helical ribs on the opposite side of the screw fall out and roll back into the bulk supply.

It will be observed that the caps, cylindrical in form and open at one end, may fall between the helical ribs at random, and may assume any one of six different positions, as follows: the open end may be facing the observer, as viewed in Fig. 1, and with its axis at right angle to the axis of the screw conveyer; the open end may be facing away from the observer, as viewed in Fig. 1; and the open end may be facing upwardly; downwardly; forwardly; or, rearwardly with respect to the axis of the screw conveyer. Provision is made for changing the position of the caps as they are being conveyed to the delivery end of the apparatus so that when they are deposited in the feeding chute 18 they will all be facing in the same direction. The changes in position of the caps as they are being conveyed are effected by mechanism including projections from and indentations formed in the guide plate 90 against which the caps are frictionally engaged during their conveyance, and the various points or stations along the conveyer at which a cap may be operated upon are herein indicated by Roman numerals I to VII as shown in Fig. 1. Whether or not a cap is affected or operated upon by one or more of the turning devices at the various stations is determined by the direction in which the cap is facing when it arrives at a particular station. Thus, if a cap is facing in the proper direction when it arrives at station I, it will pass by this station and all subsequent stations without being affected thereby, and will be deposited in the feeding chute facing in the proper or preferred direction.

In the illustrated embodiment of the invention, it is preferred to dispose the caps in a direction such that the open ends of the caps face toward the observer, viewing Fig. 1, and with the axis of the cap at right angles to the axis of the screw conveyer, when they arrive at the delivery end of the apparatus. As above stated, if a cap falls into the conveyer facing in this direction it will be carried past all the turning stations without being affected thereby and will be delivered to the feeding chute 18 with the open end facing toward the observer. Each station will now be described with reference to a particular position which the cap may assume when it arrives at such station as follows:

Referring now to Figs. 8 to 13 inclusive, illustrating station I, it will be observed that a curved projection 92, secured to the guide plate 90 is arranged to engage an upright cap, whether the open end is facing upwardly or downwardly, and operate to turn it over on its side. If the cap arrives at station I with its open end facing upwardly as shown in Figs. 8, 9 and 10, the top edge of the cap will be engaged by the edge 94 of the projection 92 and in cooperation with the rotary movement of the conveyer, the cap will be turned over on its side with its open end facing toward the observer as shown. Since this cap is now facing in the preferred direction, it will pass all subsequent stations without being affected thereby.

Similarly, if a cap arrives at station I with its open end facing down, it will be turned over on its side with its open end facing away from the observer as illustrated in Figs. 11, 12, and 13, in a position to be operated upon by subsequent stations.

If the cap is already disposed on its side when it arrives at station I, it will pass by the edge 94 and under the projection 92 to be operated upon by subsequent stations. In the event that more than one cap is engaged between the helical ribs, that is, if they are piled up one above the other, the extended portion 96 of the projection 92 at station I will operate to remove such surplus caps which fall by gravity back into the bulk supply.

In the operation of the machine as above described, it will be observed that during the rotation or movement of the cap as it is turned from one position to another, the center of gravity of the cap is at all times such as to maintain the cap supported on top of the shank 60 and against the plate 90.

Referring now to Figs. 14, 15, and 16, illustrating station II, it will be observed that a depressed or cut out portion 100 is provided in the guide plate 90 and a small helical projection 102, having half the pitch of the helical ribs of the screw conveyer, is secured to the central shank 60 by a screw 104. When a cap arrives at this station with its open end facing forwardly, as illustrated in Fig. 14, the leading edge of the cap is engaged by the small helical projection and is tripped up so that the cap assumes an upright position with its open end facing downwardly, to be operated upon at a subsequent station. The cut out portion 100 in the guide plate 90 affords clearance for the cap to tip upright, as illustrated, and also assists in guiding the caps into the position indicated.

As illustrated in Fig. 17, if a cap arrives at station II with its open end facing rearwardly, the cap will be turned upright in a similar manner, with its open end facing upwardly, as shown.

Station III is identical with and serves the same purpose as station I, so that caps which have been turned upright at station II as above described, will be operated upon by station III to turn them on their sides with their open ends facing either toward or away from the observer, depending upon whether they arrive at such station with their open ends facing upwardly or downwardly, respectively, as described in connection with station I. As illustrated in Figs. 1 and 2, it will be observed that the side wall 16 is provided with an opening 106 adjacent station III through which any extra or surplus caps, inadvertently retained or deposited on top of a cap normally being conveyed between the helical ribs, will be rejected by the projection 92 to fall into a conduit 108 adjacent the screw conveyer. The conduit 108 serves to guide such caps back to permit them to join the bulk supply in the hopper 10 and, as shown in Figs. 2 and 3, the side wall of the hopper 10 is provided with an opening 110 through which the caps are guided into the hopper to again be received between the helical ribs of the screw conveyer.

Station IV is identical with and serves the same purpose as station II, that is, any caps which arrive at this station with their axes parallel to the axis of the screw conveyer are turned upright so that their axes are disposed perpendicular to the axis of the screw conveyer, as described. Station IV is primarily a safety for station II so that any caps which inadvertently get by station II will be taken care of at station IV.

It will be observed that stations II and IV are operative only upon caps which are being conveyed with their axes parallel to the axis of the screw conveyer, all caps in other positions passing by such stations without being affected thereby.

From the description thus far it will be observed that when the caps being conveyed between the helical ribs of the screw conveyer pass beyond station IV, they will be facing in any one of four different directions, that is, a cap may be positioned with its open end facing the observer, in which event it will pass by all subsequent stations to be delivered to the feed chute 18; it may be positioned with its open end facing away from the observer; or it may be positioned upright, its open end facing either upwardly or downwardly as the case may be. In other words, the cap may be disposed in any of the six possible positions between the helical ribs except with its axis parallel to the screw conveyer axis. Hence, the remaining stations, V, VI and VII are designed to effect repositioning of the caps which arrive at these stations in any one of three different and undesired positions.

Referring now to Figs. 18 and 19 illustrating station V, if a cap arrives at this station with its open end facing upwardly, it will be gradually turned over on its side with its open end facing toward the observer, by virtue of its engagement with cut out or depressed portions 112 as best shown in the cross-sectional views Figs. 19, 20 and 21. It will be observed by reference to the cut out portion shown in Fig. 19 that the cap is suspended between the top of the shank 60 and the upper edge of the plate 90 and that the lower right hand edge of the cap is shifted toward the plate and into the path of a shoulder 114 of the cut out portion 112 by the frictional engagement of the rotating shank 60 and by the influence of gravity. Hence, when the cap is advanced, the upwardly inclined shoulder 114 of the cut out tends to lift the right hand edge of the cap upwardly, as shown in Fig. 20, the cap still tending to rotate counterclockwise by the frictional engagement of the rotating shank 60. Thereafter, the contours of the shoulder 114 and the cut out 112 are such that the cap is gradually turned, see Fig. 21, until it assumes a position with its open end facing the observer, which is the desired position, and hence will pass all subsequent stations without being affected thereby. It will be observed that if a cap arrives at station V in the desired position, it will not be affected by the cut out 112 since the closed end of the cap holds the cap out away from the shoulder 114. In practice, the closed end of the cap is usually beveled or rounded, as illustrated, which assists in enabling the closed end of the cap to skip over the cut outs without being turned up.

In the event that a cap arrives at station V with its open end facing away from the observer, as illustrated in Fig. 22, the lower right hand edge of the cap will likewise be caused to assume a position to be engaged by the upwardly inclined shoulder 114 of the cut out 112, which will effect counterclockwise rotation of the cap one quarter of a revolution, see Figs. 23 and 24, to dispose the cap with its open end facing upwardly.

Thereafter the cap with its open end facing upwardly will pass through station VI which is identical with station V and the cap will be again rotated counterclockwise one quarter of a revolution, the action being similar to that illustrated in Figs. 19, 20, 21 to dispose the cap in the preferred position, as above described.

Referring now to Fig. 25, in the event a cap should arrive at station V with its open end facing downwardly, the cap will be similarly rotated one quarter turn counterclockwise, see Figs. 26 and 27, to assume a position with its open end facing away from the observer. The cap is then received in this position by station VI, to be turned again as illustrated in Figs. 22, 23, and 24, to assume a position with its open end facing upwardly. Thereafter, the cap with its open end facing upwardly will be received by station VII which is identical with stations V and VI, to be rotated in a manner similar to that illustrated in Figs. 19, 20 and 21, to dispose the cap in the preferred position.

From the above description, it will be apparent that when the caps pass beyond station VII they are all faced in the same direction, that is, with their open end facing the observer. Referring now to Figs. 1 and 5, when the caps arrive at the top of the helix they are guided between a lower guide member comprising the upper surface 120 of the bearing member 74 and an upper guide member 122 the latter being pivotally supported upon a pin 125 attached to and extending from the side wall 16 of the apparatus. The pivotally mounted guide member 122 is limited in its downward movement, in the position shown in Fig. 1, by engagement with a second pin 127 extending from the sidewall 16, this construction enabling the guide member to adjust itself to permit caps of varying diameters to pass. As successive caps are fed into the guideway thus formed, the preceding caps are pushed forwardly, the closed ends of the caps still being supported by the guide plate 90. The foremost cap rolls off the edge of the lower guide member and falls by gravity into the feeding chute 18 to rest on top of the preceding caps. The caps thus disposed are then guided through the chute 18 into a position to be withdrawn by the transfer member 20 or other device to which the caps are being supplied, as previously described. The position at which the caps are delivered to the top of the feed chute 18 is designated in the drawings as station VIII.

In the event that the feed chute is entirely filled when the cap arrives at station VIII, it will roll over the uppermost cap in the chute onto a beveled plate 124 disposed at the end of the apparatus. A cap thus rejected falls through an opening 126 provided in the conduit 108, to be returned to the bulk supply in the hopper, as above described.

The description thus far has been confined to the apparatus illustrated in Figs. 1 to 27 inclusive, showing an embodiment of the invention which is particularly adapted to handle caps which are relatively tall with relation to their diameter. Referring now to Figs. 28 to 38, inclusive, the apparatus therein shown illustrates an embodiment of the invention particularly adapted for handling caps which are relatively short as compared with their diameters. In practice, one unit may be employed for both types of caps by replacing some of the parts including the guide plate 90 which is replaced by a guide plate 130 as illustrated in Fig. 28, and making other necessary adjustments to accommodate the particular cap or group of caps of different sizes being run.

In the apparatus illustrated in Fig. 28, the guide plate 130 is disposed with relation to the screw conveyer 12 to permit the short or thin caps to fall edgeways between the shank 60 and the guide plate 130 and to be carried along between the helical ribs of the screw conveyer in this manner. The caps in the supply hopper are permitted to fall into the screw conveyer at random, and provision is made for turning such caps as they are advanced past the various stations so that they will all face in the same direction when they are delivered to the feeding chute 18. The preferred position of the short cap when it arrives at the delivery end of the apparatus is with its open end facing the observer viewing Fig. 28. In the event that a cap is initially received in the correct or preferred position in the screw conveyer 12, it will be carried through the machine without being affected by the various stations through which it passes.

In handling the short caps there are only four possible positions which the cap might assume as it is being carried forward by the screw conveyer, that is, a cap may be riding edgeways in the correct position, as above described; it may be riding edgeways facing with its open end away from the observer; or it may be riding along the top of the shank 60, facing either upwardly or downwardly as the case may be, one edge of the cap being supported by the guide plate 130, as illustrated. The various stations designed to operate upon such caps to turn them in the preferred position are designated in Fig. 28 by Roman numerals Ia to VIa inclusive.

In the event that the short cap arrives at station I riding along the top of the shank 60 and with its open end facing downwardly, as shown in Fig. 31, the right hand edge of the cap will be received in a grooved portion 132, cut in the guide plate 130 with its lower right hand edge resting on the shoulder 134 of the groove. As the cap is advanced the edge of the cap is lifted, as shown in Fig. 32, by an upwardly inclined shouldered portion 136 formed as a continuation of the shoulder 134, the frictional engagement of the rotating shank 60 assisting in the counterclockwise turning movement of the cap. Further forward motion of the cap causes it to ride up the inclined groove 136 until the cap assumes a position as shown in Fig. 33 whereupon it will fall edgewise into the space between the shank and the guide plate, as illustrated, the side of the plate 130 being cut away as at 138 to guide the cap in this direction. The cap is now facing with its open end away from the observer, in position to be operated upon by subsequent stations as it is advanced by the screw conveyer.

As illustrated in Fig. 28 an opening 140 is provided in the guide plate 130 and the side wall 16 at station IIa through which any surplus caps which might be riding on top of the caps caught between the ribs of the helix are rejected, to fall into a conduit and be returned to the bulk supply in the hopper in a manner similar to that shown in Fig. 2.

In the event that the cap arrives at station Ia riding along the top of the shank 60 with its open end facing upwardly, such cap will be received and carried along in the groove 132 and will be guided in a counterclockwise direction by the beveled or cut away surface 138 as it is urged in this direction by the frictional engagement of the shank 60. The cap will then fall edgeways into the space between the shank and the plate with its open end facing the observer which is the preferred position.

Referring now to Figs. 34 to 37, inclusive, illustrated stations IIIa and IVa, a cap which arrives at such stations with its open end facing away from the observer will be lifted up out of the space between the shank 60 and the guide plate 130 to rest on top of the shank facing upwardly at station III whereupon such cap will be again turned counterclockwise at station IVa to be disposed in the preferred direction.

As illustrated in Figs. 35 and 38, the leading edge of a cap facing away from the observer is caused to fall into a depressed portion 142 in the guide plate 130 at station IIIa which causes the lower edge of the cap to be guided into an upwardly inclined track 144 as it is advanced by the screw conveyer, see Fig. 36. The contour of the track 144 is such as to turn the lower right hand edge of the cap upwardly as shown in Fig. 37, leaving the cap supported on top of the shank, one edge resting against the guide plate 130. The cap being thus advanced with its open end facing upwardly is received at station IVa which is similar to station Ia, and in the manner above described the cap will be turned counterclockwise to fall into the preferred position, as illustrated in Fig. 34. As shown in dotted lines in Fig. 38, any caps which arrive at station IIIa facing in the preferred direction, will pass by without being affected thereby.

Stations Va and VIa as indicated in Fig. 28 are identical with stations IIIa and IVa and serve the same purpose in the event that any caps inadvertently get by the latter stations.

Referring now to Fig. 29, the delivery end of the apparatus is arranged to receive the caps being carried up on edge, the cap being fed by the screw conveyer in a guideway formed between the bearing member 74 and the plate 130, as illustrated. The caps thus being advanced, fall into the feed chute 18 at station VIIa, the surplus caps being returned through the conduit 108, to the bulk supply, as previously described in connection with the embodiment of the invention illustrated in Fig. 1. It will be observed that the present delivery end differs from the previously described embodiment in that the caps ride between the guide plate and the bearing, whereas in the previously described embodiment, the caps ride on top of the bearing member 74. In practice, the delivery end of the apparatus may be easily and quickly changed from one embodiment to another by merely removing an insert 75, as shown in Fig. 2, to take care of the thin or short caps.

In practice, it has been found that the same size of screw conveyer may be used in both embodiments of the invention above described, depending upon the diameter of the caps being handled although it will be apparent that pitch of the helix must be equal to or slightly greater than the largest diameter cap being run.

While different embodiments of the invention have been herein illustrated and described, it will be understood that the invention may be embodied in other forms within the scope of the following claims.

Having thus described the invention, what is claimed is:

1. In a closure handling machine, in combination, a hopper for containing a bulk supply of the closures, means for automatically withdrawing successive closures from the bulk supply including a screw conveyor for advancing said closures away from said hopper with the closures facing in random directions, a stationary guide member for maintaining said closures in engagement with said screw conveyor to provide for said advancement of said closures, said guide member having camming portions adapted to engage closures facing in undesired directions to effect turning of the last-mentioned closures so that all of the closures will be uniformly disposed at the delivery end of the conveyor.

2. In a closure handling machine, in combination, a hopper for containing a bulk supply of the closures, means for automatically withdrawing successive closures from the bulk supply including a screw conveyor for advancing said closures away from said hopper with the closures facing in random directions, a stationary guide member positioned to at least partially support said closures during their advancement by said conveyor, said guide member having camming portions adapted to engage closures facing in undesired directions to effect turning of the last-mentioned closures so that all of said closures will be uniformly disposed at the delivery end of the conveyor.

3. In a closure handling machine, in combination, a hopper for containing a bulk supply of the closures, means for automatically withdrawing successive closures from the bulk supply including a screw conveyor for advancing said closures away from said hopper with the closures facing in random directions, a stationary guide member for maintaining said closures in engagement with said screw conveyor to provide for said advancement of said closures, said guide member being provided with recesses therein having camming portions adapted to engage closures facing in undesired directions to effect turning of the last-mentioned closures so that all of said closures will be uniformly disposed at the delivery end of the conveyor.

4. In a closure handling machine, in combination, a hopper for containing a bulk supply of the closures, means for automatically withdrawing successive closures from the bulk supply including a screw conveyer having one end disposed in the hopper and by which closures are conveyed from the hopper, and means adjacent said screw conveyer including a guide member having projections and depressions adapted to cooperate with the latter to effect turning of those closures which face in an undesired direction so that all closures will be uniformly disposed at the delivery end of the conveyor.

5. In a closure handling machine, in combination, a hopper for containing a bulk supply of closures, means for automatically withdrawing successive closures at random from the bulk supply including a screw conveyor, and means adjacent said screw conveyor including a guide member having projections and depressions adapted to cooperate with the latter to effect turning of selected of said closures as they are being conveyed so that the closures will be uniformly disposed when they reach the delivery end of the conveyer, and a feed chute disposed at the delivery end of said conveyer into which said uniformly disposed closures are deposited.

6. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, and means disposed adjacent said screw conveyer including a guide member having projections and depressions adapted to cooperate with the latter to effect turning of selected of said closures as they are being conveyed between said helical ribs in a manner such as to cause all the closures to be uniformly disposed when they arrive at the delivery end of the conveyer.

7. A closure handling machine having, in combination, a hopper for containing a bulk supply of closures, means for automatically withdrawing successive closures including a rotatable screw conveyer comprising a central shank having a helical member forming adjacent rib sections between which the closures are withdrawn from the hopper in whatever position they happen to pass into said sections, said screw conveyer being disposed in an upwardly inclined position, a guide plate angularly disposed adjacent one side of said conveyer in a position to cause the closures being carried between said rib sections to fall against and frictionally engage the same, said guide plate having projections and depressions arranged to effect turning of those closures facing in any but one direction as they are being conveyed into a position to cause the closures to be uniformly disposed when they arrive at the delivery end of said conveyer.

8. A closure handling machine having, in combination, a hopper for containing a bulk supply of closures relatively tall with relation to their diameters, means for automatically withdrawing successive closures from the bulk supply including a rotatable screw conveyer comprising a central shank having a helical member forming adjacent rib sections between which successive closures are deposited to be conveyed from the hopper and without reference to the direction of facing, said screw conveyer being disposed in an upwardly inclined position, a guide plate angularly disposed adjacent one side of said conveyer in a position such as to cause the closures being carried between said rib sections to ride on top of the shank and to fall against and frictionally engage said guide plate, said guide plate being provided with projections and depressions shaped to cooperate with said screw conveyer to effect turning of those closures which face in any but one direction whereby to cause the closures to face uniformly when they arrive at the delivery end of said conveyer.

9. A closure handling machine having, in combination, a hopper for containing a bulk supply of closures relatively short with relation to their diameters, means for automatically withdrawing successive closures from the bulk supply including a rotatable screw conveyer comprising a central shank having a helical member forming adjacent rib sections between which the closures are conveyed, said screw conveyer being disposed in an upwardly inclined position, a guide plate angularly disposed adjacent one side of said conveyer in a position such as to cause the relatively short closures being carried between said rib sections to ride between said shank and said guide plate and to frictionally engage the latter, said guide plate being provided with depressions and projections shaped to cooperate with said screw conveyer to effect turning of said disposed closures as they are being conveyed to cause the closures to face uniformly when they arrive at the delivery end of said conveyer.

10. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, means disposed adjacent said screw conveyer including a guide plate having projections and depressions adapted to cooperate with the latter to effect turning of said closures as they are being conveyed in a manner such as to cause all the closures to be uniformly disposed when they arrive at the delivery end of the conveyer, a feed chute disposed at the delivery end of said screw conveyer into which said uniformly disposed closures are deposited, and means adjacent said feed chute for rejecting surplus closures.

11. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, means disposed adjacent said screw conveyer including a guide plate having projections and depressions adapted to cooperate with the latter to effect turning of closures as they are being conveyed between said helical ribs in a manner such as to cause all the closures to be uniformly disposed when they arrive at the delivery end of the conveyer, a feed chute disposed at the delivery end of said screw conveyer into which said uniformly disposed closures are deposited, means adjacent said feed chute for rejecting surplus closures, and a conduit for receiving said rejected closures and guiding them back to said hopper.

12. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, said screw conveyer being disposed in an upwardly inclined position, a guide plate angularly disposed adjacent one side of said conveyer in a manner such as to cause the closures being carried between said rib sections to fall against and frictionally engage the same, said guide plate having projections and depressions adapted to cooperate with said screw conveyer to effect turning of said closures as they are being conveyed to cause the closures to be uniformly disposed when they arrive at the delivery end of said conveyer, and means adjacent said guide plate arranged to remove surplus closures riding on top of those normally positioned between said rib sections and for returning said surplus closures to the bulk supply.

13. In a closure handling machine, in combination, a hopper for containing a bulk supply of the closures, a feed chute for the closures, and means for automatically withdrawing successive closures from the hopper and depositing them in the feed chute including a rotatable screw conveyer arranged to pass through and beyond the bulk supply of closures in said hopper, the pitch of said screw being equal to or slightly greater than the diameter of the closures being handled, and means including a guide plate having projections and depressions arranged to cooperate with said screw conveyer for turning selected of the closures being conveyed to cause them to face uniformly when deposited in the feed chute.

14. A closure handling machine having, in combination, a hopper for containing a bulk supply of closures relatively tall with relation to their diameters, means for automatically withdrawing successive closures from the bulk supply including a rotatable screw conveyer comprising a central shank having a helical member forming adjacent rib sections between which the closures are conveyed, said screw conveyer being disposed in an upwardly inclined position, a guide plate angularly disposed adjacent one side of said conveyer in a manner such as to cause the relatively tall closures being carried between said rib sections to ride on top of the shank and to fall against and frictionally engage said guide plate, said guide plate being provided with projections and depressions adapted to cooperate with said screw conveyer to effect turning of said closures as they are being conveyed to cause all the closures to be uniformly disposed when they arrive at the delivery end of said conveyer, said shank also being provided with a relatively small helical rib of less pitch than the helical conveying rib adapted to effect turning of some of said randomly disposed closures as they are conveyed.

15. A closure handling machine having, in combination, a hopper for containing a bulk supply of closures, means for automatically withdrawing successive closures from the bulk supply including a rotatable screw conveyer comprising a central shank having a continuous helical member forming adjacent rib sections between which the closures are conveyed, means disposed adjacent said screw conveyer including a guide plate having projections and depressions adapted to cooperate with the latter to effect turning selected of said closures as they are being conveyed between said helical ribs in a manner such as to cause the closures to be uniformly disposed when they arrive at the delivery end of the conveyer, said screw conveyer and said turning means being arranged at angular positions such as to cause said closures to be retained by gravity in frictional engagement with said screw conveyer and said guide plate.

16. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, means disposed adjacent said screw conveyer including a guide plate having projections and depressions adapted to cooperate with the latter to effect turning of said closures as they are being conveyed between said helical ribs in a manner such as to cause the closures to be uniformly disposed when they arrive at the delivery end of the conveyer, and means disposed in said hopper for controlling the feed of said closures to said screw conveyer to prevent arching of the closures over the latter.

17. A closure handling machine having, in combination, a hopper for containing a bulk supply of closures, means for automatically withdrawing successive closures from the bulk supply including a rotatable screw conveyer comprising a central shank having a helical member forming adjacent rib sections between which the closures are conveyed, said screw conveyer being disposed in an upwardly inclined position, a guide member angularly disposed adjacent one side of said conveyer in a manner such as to cause the closure being carried between said rib sections to fall against and frictionally engage the same, said guide plate being provided with a plurality of stations comprising depressions therein and projections therefrom, each adapted to cooperate with said screw conveyer to effect one quarter of a turn of selected irregularly disposed closures arriving at such station, said stations being adapted to permit other closures to pass by to be operated upon by subsequent stations whereby to cause the closures to face uniformly when they arrive at the delivery end of said conveyer.

ARTHUR CLARENCE EVERETT.